(12) United States Patent
Smith et al.

(10) Patent No.: US 8,323,595 B1
(45) Date of Patent: Dec. 4, 2012

(54) RECOVERY OF HIGH PURITY LEAD OXIDE FROM LEAD ACID BATTERY PASTE

(75) Inventors: W. Novis Smith, Philadephia, PA (US); Steven A. Kinsbursky, Anaheim, CA (US)

(73) Assignee: Toxco, Inc., Anaheim, CA (US)

( * ) Notice: Subject to any disclaimer, the term of this patent is extended or adjusted under 35 U.S.C. 154(b) by 0 days.

(21) Appl. No.: 13/199,580

(22) Filed: Sep. 3, 2011

(51) Int. Cl.
*C22B 13/00* (2006.01)
(52) U.S. Cl. ............ 423/89; 423/473; 423/500
(58) Field of Classification Search .......... 423/89, 423/473, 500
See application file for complete search history.

(56) References Cited

U.S. PATENT DOCUMENTS

| 1,992,395 | A | * | 2/1935 | Rose et al. ............ 423/620 |
| 2,094,276 | A | * | 9/1937 | Mitchell et al. .......... 423/94 |
| 3,943,004 | A | * | 3/1976 | Honer et al. ............ 429/119 |
| 4,222,769 | A | * | 9/1980 | Okuda et al. ............ 75/432 |
| 4,769,116 | A | * | 9/1988 | Olper et al. ............ 205/599 |
| 5,211,818 | A | * | 5/1993 | Moure et al. ............ 205/599 |
| 7,507,496 | B1 | * | 3/2009 | Kinsbursky et al. .......... 429/49 |
| 7,785,561 | B1 | * | 8/2010 | Smith et al. ............ 423/619 |
| 2006/0239903 | A1 | * | 10/2006 | Guerriero et al. ............ 423/619 |
| 2008/0233482 | A1 | * | 9/2008 | Prengaman et al. .......... 429/245 |
| 2010/0043600 | A1 | * | 2/2010 | Martini .......... 75/743 |

FOREIGN PATENT DOCUMENTS

WO   99/44942   *   9/1999

* cited by examiner

*Primary Examiner* — Steven Bos
(74) *Attorney, Agent, or Firm* — John Lezdey

(57) ABSTRACT

There is provided a process for recovering high purity litharge PbO from spent lead acid battery paste at low temperatures and the further preparation of highly pure lead oxides and $Pb(OH)_2$.

12 Claims, No Drawings

RECOVERY OF HIGH PURITY LEAD OXIDE FROM LEAD ACID BATTERY PASTE

FIELD OF THE INVENTION

The invention relates to the recovery of high purity lead oxide (PbO) from spent lead acid battery paste at low temperatures and the further preparation of other highly pure lead oxides.

BACKGROUND OF THE INVENTION

The recovery of high purity lead oxide materials (99.99+%) from lead acid battery pastes has been a long standing requirement with the lead battery manufacturers. The lead oxide has value only as a high purity material. Currently the commercial practice is to send this paste recovered from crushing lead acid batteries to the lead smelters who separately process this mix of red lead, lead sulfate with carbon to obtain a crude lead metal product. This lead metal is then separately reacted with flux and air to remove the contaminating impurities such as antimony, barium, calcium, sulfur, copper, arsenic and other metals.

In U.S. Pat. No. 4,222,769 spent battery paste is desulfurized and then transformed into metallic lead by roasting in the presence of a carbon reducing agent.

U.S. Pat. No. 4,769,110 discloses treating exhausted lead acid battery paste with sodium hydroxide to produce a solution of sodium sulfate and a desulfurized paste which is subjected to electrowinning to produce metallic lead.

International Publication No. WO99/44942 discloses a process of producing lead monoxide from spent lead battery paste using fluxing agents and an organic reducing agent in a calcination step at a temperature of 400° C.-40° C.

U.S. Patent Publication No. 2006/1124094 to Guerriero discloses high purity lead hydroxide and lead oxide from spent acid battery paste that has been desulfurized and converted into a carbonate or hydroxide and then calcinated at 500° C. to obtain pure PbO. The multi-step process includes subsequent treating with acetic acid. The lead acetate solution was treated with an alkali or alkaline earth hydroxide to produce lead hydroxide.

U.S. Patent Publication No. 2010/043600 to Martini discloses a process for recovery of high purity lead compounds from electrode paste slime. The process includes dissolving lead oxide in the paste in suitable acid, reducing any insoluble lead dioxide with hydrogen peroxide, a sulfite or sulfurous anhydride, converting the lead oxide to lead sulfate and then treating the lead sulfate in a solution containing an acetate, calcinating the desulfurized material to get impure lead monoxide followed by leaching of the lead monoxide with acetic acid followed by filtering and then treating further with an alkali hydroxide or alkaline earth hydroxide to obtain soluble acetates to get a precipitate of lead hydrate or lead monoxide.

U.S. Pat. No. 7,507,496 to Smith et al relates to the selective removal of sulfate from battery paste and recovering $Pb_3O_4$ which has small amounts of impurities and can be separated from the impurities by dissolution.

According to U.S. Pat. No. 4,222,769, an extracted spent battery paste is desulfurized and then transformed into metallic lead by roasting in the presence of a carbon reducing agent.

In U.S. Pat. No. 4,769,116, a paste is obtained from exhausted lead-acid batteries and treated with sodium hydroxide to produce a solution of sodium sulfate and a desulfurized paste. Pure metallic lead is further recovered from the desulfurized paste by electrowinning.

U.S. Pat. No. 5,211,818 discloses a process wherein the paste sludge resulting from the exhausted batteries is treated with a solution of ammonium sulfate and the metallic lead constituent is recovered by electrowinning.

International Publication No. WO99/44942 discloses a process of producing lead monoxide from spent lead batteries using fluxing agents and an organic reducer in the calcinations step at a temperature of 400° C.-450° C.

Currently a significant amount of the lead oxide paste used in making electrodes for lead acid batteries utilizes a material called leady-lead oxide. Typically this material is made in the Barton process by heating lead metal to 350-500° C. to keep it molten and passing controlled amounts of air or oxygen through it to partially oxidize it to litharge and 25% lead with strong agitation. The lead oxide (litharge) that forms initially contains very fine lead metal which is intimately mixed into the litharge and more slowly reacts. This leady lead oxide which is screened and classified and usually contains about 15-30% lead metal can be used to form lead acid battery electrodes. When this material is introduced into a rake furnace with air at about 500° C. it slowly converts to pure red lead ($Pb_3O_4$). In either case the starting material is pure lead metal for the raw material and this must be carefully oxidized.

Alternatively, mixed lead oxides recovered from battery lead oxide pastes are mixed with carbon and smelted directly in a furnace to make molten lead. Then the resulting lead in ingot form is shipped to a plant which has a Barton reactor or ball mill process to be oxidized to the leady lead oxide. The material is subsequently oxidized in another furnace to red lead or pure litharge depending upon temperature and other conditions. This prior art procedure is more costly, requires greater energy expenditure, and requires pollution control.

SUMMARY OF THE INVENTION

According to the invention, litharge lead monoxide (PbO) is prepared from spent lead acid battery paste at temperatures between ambient and 150°-180° C. by the steps comprising;
A) treating said paste with dilute sulfuric acid;
B) treating the mixture from step A) with an alkali chloride to reduce the lead in said paste to 2+;
C) treat the mixture from step B) with a dilute solution of an alkali hydroxide or soda ash to a pH of about 12;
D) filtering the product of step C);
E) add a dilute solution of a carboxylic acid to the filter cake of step D);
F) heat the mixture of step E) to 80-90° C., and filter the resulting composition;
G) treating the resulting filtrate from step F) with concentrated alkali hydroxide at a temperature of 80-100° C. to form pure litharge PbO under an inert atmosphere, and then alternately, the condition of G) can be modified to room temperature and a stoichiamatic amount of NaOH added to form $Pb(OH)_2$ which is subsequently heated to 150-200° C. to form pure litharge, and then
H) recovering litharge PbO.
Optionally, Step G) can be modified by using stoichionsetric amounts of sodium hydroxide at a temperature of ambient to 50° C. to form $Pb(OH)_2$ and $PbO.½H_2O$ which is subsequently heated to about 150-200° C. to form pure litharge.

It is therefore an object of the invention to recover litharge PbO from spent lead acid battery paste.

It is another object of the invention to prepare high purity leady lead oxide with the PbO produced by the invention.

It is a further object of the invention to produce high purity leady lead oxide with the litharge PbO of the invention.

It is yet another object of the invention to produce high purity $Pb_3O_4$ with the litharge PbO of the invention.

It is still a further object of the invention to produce high purity $Pb(OH)_2$ with the invention.

DESCRIPTION OF THE PREFERRED EMBODIMENTS

According to the present invention, lead monoxide (PbO) can be prepared in high yields and high purity from spent lead acid battery paste. The present process initially reduces all the lad compounds to divalent lead (Pb++) and then removes any sulfur containing compounds which is primarily all of the sulfate contained. The impure lead oxide (PbO) present then undergo the following reaction:

The reactions by step are as follows:

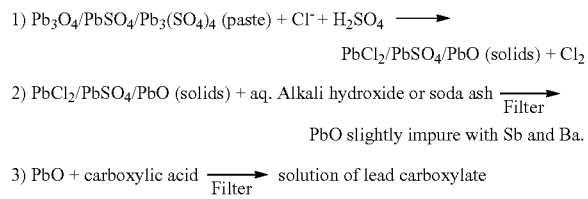

4) Solution of lead carboxylate+hot alkali $OH^- \rightarrow PbO$ (very fine 100% litharge)

5) Or optionally first obtaining $Pb(OH)_2$ and heating to obtain PbO.

According to the present invention, there is provided an improvement in the process of recovering highly pure litharge PbO from lead acid battery paste which comprises the steps of:

A) Treating the spent battery paste which comprises $Pb_3O_4$, $PbSO_4$ and $Pb_2(SO_4)_4$ with hydrochloric acid or an alkali chloride and sulphuric acid;

B) Treating the product from step A) with an alkali hydroxide to form PbO and then filtering;

C) Treating the PbO from step B) with a carboxylic acid to form a solution of lead carboxylate and filtering; and then D) Treating the solution of lead carboxylate from step C) with an alkali hydroxide to obtain highly pure litharge PbO and/or $Pb(OH)_2$.

The highly pure litharge PbO and $Pb(OH)_2$ can be used to prepare highly pure Lead oxide by reacting it with lead metal shot under an inert atmosphere at temperatures of about 400-450° C.

Alternatively the PbO and $Pb(OH)_2$ can be mixed with micronized lead. The highly pure litharge PbO can also be used to prepare highly pure $Pb_3O_4$ by heating the litharge PbO in a furnace under oxygen or air at temperatures of 450-500° C.

The solution of lead carboxylate from the process of the invention can be treated with a solution of an alkali hydroxide in a carbon dioxide free atmosphere to reach a pH of about 10.5 to obtain highly pure $Pb(OH)_2$ precipitate.

The 100% litharge (orange form) which is produced under the preferred conditions of the present process can be mixed with 25% by weight molten lead metal under nitrogen or inert atmosphere with vigorous stirring to quickly produce the preferred industrial starting material for making lead acid battery electrodes called leady oxide or leady lead oxide. The preferred leady oxide contains 25% lead and 75% PbO as litharge. This material is usually produced commercially in a Barton reactor or ball mill at 480-550° C. in air requiring many hours of stirring and heating resulting in excessive heat and energy. The actual final compositions from these commercial processes is difficult to control due to the many variables involved so that the actual composition range will run 15-30% lead metal content. In addition, it is preferred to have 100% of the PbO as the litharge form, but in practice the higher temperature massicot (yellow-white) form is also present due to the excessive heating required. This new process of taking very pure 100% litharge and mixing with molten lead metal at 400-450° C. under nitrogen to prevent any oxidation of the lead while the rapid quick mixing occurs is a major step forward for achieving a low cost, very high purity material with a precise composition which is desired by the lead acid battery manufacturers. By mixing the PbO with very fine lead power at room temperature this new leady oxide material which has not been available before due to the high cost by other routes, lack of control, and need for the high purity litharge produced by this process is an important advance for the lead acid battery industry.

Not only does the present described process save significant energy and reduces sulfur emissions compared to smelter recycling, it also produces a very pure highly desired, and higher performing leady oxide at lower cost.

A straight forward process has been found to produce pure litharge (PbO) from the paste from the electrodes from spent lead acid batteries and having an elemental purity of >99.99%. This process produces pure litharge using low cost raw materials and minimum energy requirements and minimum capital equipment costs. No furnace is required and all process steps are from room temperature up to a maximum of 180° C. Lead recovery as litharge is >92% and the remaining usable lead metal and antimony lead alloy recovered for smelting. No expensive organic reducing agents, nitric acid, or hydrogen peroxide are used. This is an extremely low cost, very efficient process which greatly reduces the environmental impact of recycling hazardous waste produce.

It has been also found that by combining the process step of: 1) reacting chloride anion (reducing agent) in an acid media in the presence of lead paste (U.S. Pat. No. 7,785,561) followed by filtration; 2) then treatment of the off white gray solid PbO/sulfate with an alkali hydroxide solution such as sodium hydroxide followed by filtration; 3) dissolving the resulting impure PbO in a carboxylic acid water and filtering off the small amount of insoluble impurities (including lead antimony alloy and barium sulfate) produces a clear aqueous solution of lead carboxylate; and finally, 4) pouring this solution of lead carboxylate directly into hot alkali hydroxide solution with no glass present produced a precipitate of 100% litharge. (The carboxylic acid can be recovered and recycled to the process).

Alternatively, the sodium hydroxide can be added to the stirred solution up to a pH 10-11 to precipitate $Pb(OH)_2$ which is filtered and washed and then dried and used as is or this can be heated to 150-180° C. to form litharge.

This unique combination and order of using these process steps allows the replacement of the expensive organic reducing agents described in our co-pending application and the more expensive reducing agents such as hydrogen peroxide (when in acid media), and the relatively expensive and environmentally unfriendly nitric acid with the very inexpensive chloride anion, for instance as salt.

Alternatively steps A) and B) can be combined by washing the filter precipitate from step 1) while still in the filter with sodium hydroxide solution to wash out the sulfate and chloride. This low sulfate low, low chloride PbO solid washed with sodium hydroxide from step 1) can then be processed in step C) as described.

The preferred alkali hydroxides are sodium and potassium hydroxide. The carboxylic acids contain 1 to 3 carbon atoms. The most preferred are acetic acid and formic acid.

The preferred alkali chloride is sodium chloride. The preferred inert gas is argon or nitrogen.

The Paste Compositions of the Present Invention

The lead oxide compositions of the present invention can be used to prepare either the positive or negative pastes for lead acid battery electrodes. The leady lead oxide is used for the negative paste and the red lead ($Pb_3O_4$) is used for the positive paste. The pastes contain two basic ingredients. These ingredients are 1) the lead oxide compositions of the present invention, and 2) a paste vehicle. The lead oxide compositions will typically have a particle size of about 0.1-10 microns in a representative and non-limiting embodiment. A representative positive paste will typically include about 3-25% by weight of paste vehicle therein.

Water is a representative and preferred material suitable for use as the paste vehicle for the positive paste. In addition, the positive paste can contain sulfuric acid (e.g. about 0.01-18 M), if needed. The sulfuric acid is used in situations where greater paste porosity is desired. The positive paste may contain additives or expanders which are known in the art which may improve the consistency or performance of the paste in an amount of about 0-5% by weight.

The percentages of ingredients used herein is "by weight". The spent battery paste can be obtained from spent battery paste as disclosed in U.S. patent application Ser. No. 11/006,279 of Smith, et al which is incorporated herein by reference.

EXAMPLE 1

3400 g of −140 mesh on a dry basis of damp lead acid paste material from a commercial lead acid battery crusher was stirred in 2 liters of water. Then 6 liters of 15% sulfuric acid (as battery acid recovery) was added. Then 1600 g of sodium chloride was added slowly over 90 minutes at 45° C. with slight cooling. The chlorine gas which formed during the reduction of the $Pb_3O_4$ to PbO and the mixed sulfates and chlorides was slowly conveyed by a nitrogen stream out the closed reactor into a scrubber of 10% sodium hydroxide solution to form sodium hypochlorite solution. After the sodium chloride was added and the reaction appeared to be finished, the solution temperature was raised to 90° C. to ensure all chlorine was gone. The solution was cooled to 15-20° C. an filtered. The filter cake was washed with 10% sodium hydroxide until the pH of the filtrate was 12. Then the cake was rinsed with water until the pH was about 8 and the damp cake of impure PbO transferred to a reactor, and 16 liters of water was added and the slurry stirred. 2800 g of acetic acid were then added over 1 hour with cooling and the temperature maintained at 60-80° C. The reaction slurry was then heated to 90° C. for one hour and then filtered. The cake containing the impurities was not washed and amounted to 280 g containing about 8% antimony as the lead alloy and 12% barium.

The clear hot filtrate was then added directly to a stirred reactor (no glass surfaces) containing 2306 g of 50% sodium hydroxide at 80° C. The temperature was maintained at close to 100° C. with cooling. The reactor was stirred for 30 minutes after the addition was complete under a nitrogen blanket and then filtered hot to yield a damp cake of litharge (orange). The cake was washed with distilled water until the pH of the filtrate was 7.

This cake was dried at 200° C. to produce litharge with a chemical purity >99.9%.

EXAMPLE 2

200 g of the dry recovered litharge from Example 1 was mixed under an oxygen-free atmosphere with 67 g lead metal shot and stirred while heated to 450° C. in stainless steel covered reactor for one hour to produce 267 g of leady oxide. The powder was cooled and packaged under nitrogen.

EXAMPLE 2b 200 g of the dry recovered litharge from Example 1 was mixed with 67 g of micron lead power to produce 267 g of leady oxide.

EXAMPLE 3

The lead acetate filtrate solution from Example 1 was alternatively added slowly to a 2 liter PFA reactor (no heating required) equipped with good stirring under nitrogen. 520 g of 50% NaOH was slowly added with good stirring. (Some cooling was applied to maintain the temperature below 25° C.). The pH was monitored so that only enough NaOH was added to achieve a pH of 10.5 at the finish. The slurry was filtered and the cake washed and then dried a below 50° C. produce $Pb(OH)_2$.

EXAMPLE 4

250 g of the dry recovered litharge from Example 1 was heated in a thin bed in a stainless steel tray in a furnace under air at 485° C. for 4 hours. After cooling, the deep orange $Pb_3O_4$ powder was packaged and weighed 253 g.

EXAMPLE 5

Preparation of Lead Acid Battery Breaker Paste Feed

About 10 lbs wet paste was wet screened through a SS 10 mesh screen followed by hand screened through −140 mesh. The water content as used was determined to be 13% by weight.

Step 1: Reaction of Chloride Anion and Sulfuric Acid Hydroxide to Reduce Lead to +2 State in the Paste:

2 liters of water was added to 5-gal reactor pail and then was added the 4000 g of −140 mesh lead acid breaker paste (13% water content) and the stirring and heat was turned on. To this was added 6 liters of 15% sulfuric acid (recovered from lead acid batteries). Then 1500 g sodium chloride was added slowly over 75 minutes at 50° C. with good agitation. The chlorine was slowly swept from the closed flask with a flow of air through a 10% sodium hydroxide solution which removed the chlorine as sodium hypochlorite for recovery. After the sodium chloride addition was complete, the temperature was raised to 95° C. and then cooled to room temperature and allowed to settle. The supernatant was decanted from the settled impure lead paste mixture. Then 2 liters of water was added with resumed stirring followed by the slow addition of a 20% solution of sodium hydroxide over 30 minutes to achieve pH of 12. The slurry was heated and stirred at 70° C. for 30 minutes and then filtered hot. The cake was washed until the filtrate was pH 7-8. The filter cake was transferred to a second 5 gallon reactor and 11 liter of water added and then 2800 g acetic acid (to pH 4.0-4.5) was added with good agitation over 45 minutes and the temperature allowed to rise to 80-90° C. and then maintained with cooling initially then heating for 30 minutes. The total volume was 15 liters. The hot solution was filtered to produce a clear solution of lead acetate. (The gray filter cake contained all of the antimony metal alloy and barium sulfate from the lead acid battery paste. Estimated weight of this cake was about 200 g for about 6% of the starting lead.) This filtered solution was poured rapidly and directly into a third reactor which was stainless steel containing 2300 g of stirred 50% sodium hydroxide solution at 80-90° C. under nitrogen. The temperature was kept about 100° C. for 30 minutes after the addition was complete. The yellow orange slurry was then filtered hot. The resulting litharge cake was washed with water until the washings were pH 7-8. The litharge product was then dried at 150° C. overnight and packaged. The litharge product weight was 3300 g for a recovered yield of 90% based on starting lead content.

This product can be used to produce leady oxide for lead batter electrode manufacture by mixing with molten lead or with micronized lead under nitrogen.

What is claimed is:

1. In a low temperature process for recovering high purity litharge PbO from lead acid battery paste, the improvement which comprises the steps of;
    A) treating spent battery paste containing $Pb_3O_4$, $PbSO_4$ and $Pb(SO_4)_2$ with an alkali chloride and sulfuric acid;
    B) treating the product from step A) with soda ash or alkali hydroxide solution to a pH of about 12 to form PbO or $PbCO_3$;
    C) treating the PbO or $PbCO_3$ from step B) with a carboxylic acid having 1-3 carbon atoms to form a solution of lead carboxylate; and then
    D) treating the solution of lead carboxylate with an alkali hydroxide to obtain highly pure litharge PbO or $Pb(OH)_2$.

2. The process of claim 1 wherein the alkali hydroxide is sodium hydroxide or potassium hydroxide.

3. The process of claim 1 wherein the carboxylic acid is acetic acid and in step C) a pH of about 3 to 4 is obtained.

4. The process of claim 1 wherein the temperature in step D) is about 80-90° C. and there is an inert atmosphere.

5. The process of claim 1 wherein chlorine gas is formed and collected in a sodium hydroxide solution and sodium hypochlorite is collected.

6. The process of claim 1 wherein PbO is recovered from step D) and mixed under an oxygen-free atmosphere with molten lead metal to form leady lead oxide.

7. The process of claim 1 wherein PbO is recovered from step D) and heated at an elevated temperature to form $Pb_3O_4$.

8. The process of claim 1 wherein the lead carboxylate solution of step C) is added to a solution of sodium hydroxide under an inert atmosphere at a pH of about 10.5 to form $Pb(OH)_2$.

9. The process of claim 8 wherein 50% sodium hydroxide is used and the temperature is below 25° C.

10. A process for recovering highly pure litharge PbO from spent lead acid battery paste which comprises the steps of;
    1) treating an aqueous mixture of spent lead acid battery paste with dilute sulfuric acid and then with sodium chloride to reduce any $Pb_3O_4$ present to PbO;
    2) filtering the product of step 1) and washing the filter cake with dilute sodium hydroxide until the pH of the filtrate formed was about 12;
    3) washing the filter cake of step 2) until a pH of about 8 is obtained and then treating an aqueous mixture of the filter cake with acetic acid and maintaining a temperature at 60-80° C. to form a solution of lead acetate;
    4) adding the filtrate containing lead acetate from step 3) to a sodium hydroxide solution at elevated temperatures to obtain pure litharge PbO, and then
    5) recovering the litharge PbO.

11. The process of claim 10 wherein the PbO recovered in step 4) is heated at an elevated temperature to form $Pb_3O_4$.

12. The process of claim 10 wherein a solution of sodium hydroxide is added to the lead acetate solution of step 3) under an inert atmosphere at a pH of about 10.5 to form $Pb(OH)_2$.

* * * * *